United States Patent
Rozenbaum et al.

(10) Patent No.: US 12,542,716 B2
(45) Date of Patent: Feb. 3, 2026

(54) MULTI-LAYER EDGE ARCHITECTURE SIMULATION

(71) Applicant: International Business Machines Corporation, Armonk, NY (US)

(72) Inventors: Nir Rozenbaum, Yoqneam Illit (IL); Maroon Ayoub, Fassuta (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 18/588,229

(22) Filed: Feb. 27, 2024

(65) Prior Publication Data
US 2025/0274345 A1    Aug. 28, 2025

(51) Int. Cl.
*H04L 41/0895*    (2022.01)
*H04L 41/082*    (2022.01)
*H04L 41/14*    (2022.01)

(52) U.S. Cl.
CPC ........ *H04L 41/0895* (2022.05); *H04L 41/082* (2013.01); *H04L 41/145* (2013.01)

(58) Field of Classification Search
CPC .. H04L 41/0895; H04L 41/082; H04L 41/145
USPC ........................................................ 709/231
See application file for complete search history.

(56) References Cited

U.S. PATENT DOCUMENTS

| | | | |
|---|---|---|---|
| 9,661,019 B2 | 5/2017 | Liu | |
| 10,095,596 B1* | 10/2018 | Arguelles | G06F 11/263 |
| 10,296,365 B1* | 5/2019 | Devillard | G06F 11/3452 |
| 10,812,366 B1* | 10/2020 | Berenberg | H04L 67/1014 |
| 11,502,913 B1* | 11/2022 | Kamen | H04L 43/50 |
| 12,185,134 B1* | 12/2024 | Duong | H04W 24/02 |
| 12,328,665 B2* | 6/2025 | Alasti | H04W 48/17 |
| 2003/0139917 A1 | 7/2003 | Hardwick et al. | |
| 2012/0060167 A1 | 3/2012 | Salsburg et al. | |
| 2017/0257308 A1* | 9/2017 | Cropper | H04L 67/10 |

(Continued)

FOREIGN PATENT DOCUMENTS

| | | |
|---|---|---|
| CN | 114598521 A | 6/2022 |
| WO | 2025/181571 A1 | 9/2025 |

OTHER PUBLICATIONS

Galluscio et al., "A comparison of two methods for advancing time in parallel discrete event simulation", Winter Simulation Conference Proceedings, 1995, Dec. 3-6, 1995, 08 pages, XP00631981.

(Continued)

*Primary Examiner* — Karen C Tang
(74) *Attorney, Agent, or Firm* — Garg Law Firm, PLLC; Rakesh Garg; Tihon Poltavets

(57) ABSTRACT

An embodiment establishes a virtual representation of a network configuration, wherein the virtual representation of the network configuration comprises a plurality of layers corresponding to the network configuration. The embodiment generates a plurality of workloads to simulate with the virtual representation. The embodiment generates a plurality of workload statuses to simulate with the virtual representation. The embodiment simulates the plurality of workloads. The embodiment simulates the plurality of workloads statuses. The embodiment receives simulation results responsive to simulating the plurality of workloads and from simulating the plurality of workload statuses.

20 Claims, 8 Drawing Sheets

(56) References Cited

U.S. PATENT DOCUMENTS

| | | | |
|---|---|---|---|
| 2017/0264493 A1* | 9/2017 | Cencini | H04L 67/12 |
| 2017/0308503 A1 | 10/2017 | Somohano et al. | |
| 2018/0060226 A1* | 3/2018 | Siggers | G06F 11/3698 |
| 2018/0060462 A1* | 3/2018 | Whitehead | G06F 9/4856 |
| 2018/0063235 A1* | 3/2018 | Beveridge | H04L 67/1021 |
| 2018/0068040 A1* | 3/2018 | Lewis | G06F 9/5061 |
| 2018/0165142 A1* | 6/2018 | Harutyunyan | G06F 11/0751 |
| 2018/0255479 A1 | 9/2018 | Markham et al. | |
| 2019/0173761 A1* | 6/2019 | Byers | H04L 41/142 |
| 2020/0036620 A1* | 1/2020 | Willshire | H04L 51/214 |
| 2020/0065213 A1* | 2/2020 | Poghosyan | G06Q 10/04 |
| 2020/0162383 A1* | 5/2020 | Deb | H04L 45/745 |
| 2020/0162503 A1* | 5/2020 | Shurtleff | H04L 41/0894 |
| 2020/0183769 A1* | 6/2020 | Poghosyan | G06F 11/0751 |
| 2020/0310847 A1* | 10/2020 | Schulze | H04L 67/10 |
| 2020/0310852 A1* | 10/2020 | Featonby | G06F 9/5077 |
| 2020/0374751 A1* | 11/2020 | Krishnaswamy | H04W 28/06 |
| 2020/0404076 A1* | 12/2020 | Mahadevan | G06F 9/5072 |
| 2021/0089438 A1* | 3/2021 | Gardner | G06F 11/3688 |
| 2021/0099354 A1* | 4/2021 | Panigrahi | H04L 41/12 |
| 2021/0141708 A1* | 5/2021 | Mathur | G06F 11/323 |
| 2021/0157691 A1 | 5/2021 | Lepera et al. | |
| 2021/0303431 A1* | 9/2021 | Grigoryan | G06F 11/3476 |
| 2022/0365859 A1* | 11/2022 | Borkar | G06F 3/1454 |
| 2023/0028934 A1* | 1/2023 | Shetty | H04L 67/60 |
| 2023/0124886 A1* | 4/2023 | Viswambharan | H04L 12/66 370/254 |
| 2023/0284066 A1* | 9/2023 | Anand | H04W 24/04 370/329 |
| 2024/0205165 A1* | 6/2024 | Smith | H04L 41/16 |
| 2024/0291718 A1* | 8/2024 | Vuda | H04L 41/16 |
| 2024/0305562 A1* | 9/2024 | Mishra | H04L 43/12 |
| 2024/0330533 A1* | 10/2024 | Lincourt, Jr. | G06F 30/20 |
| 2025/0036498 A1* | 1/2025 | Adeyenuwo | G06F 11/3409 |
| 2025/0077977 A1* | 3/2025 | Ahuja | G06N 20/00 |
| 2025/0097741 A1* | 3/2025 | Sharma | H04W 24/06 |
| 2025/0103392 A1* | 3/2025 | Haridas | G06F 9/4856 |
| 2025/0103474 A1* | 3/2025 | Cheverton | G06F 11/3698 |
| 2025/0106133 A1* | 3/2025 | Filsfils | H04L 43/08 |
| 2025/0141807 A1* | 5/2025 | Fröhlich | H04L 47/6215 |
| 2025/0193195 A1* | 6/2025 | Hillis | H04L 9/3268 |

OTHER PUBLICATIONS

International Searching Authority, "Notification of Transmittal of the International Search Report and the Written Opinion of the International Searching Authority, or Declaration," Patent Cooperation Treaty, Apr. 9, 2025, 14 pages, International Application No. PCT/ IB2025/050456.

IP.com, Method and System for Digital Twin Simulation Based Identifying Microservice Architecture, Feb. 15, 2021.

Fleet, Core Concepts, Dec. 21, 2023, https://fleet.rancher.io/concepts.

IBM, IBM Edge Application Manager, 2024, https://www.ibm.com/cloud/edge-application-manager.

Open Cluster Management, Make working with many Kubernetes clusters super easy regardless of where they are deployed, 2024, https://open-cluster-management.io/.

* cited by examiner

MULTI-LAYER EDGE ARCHITECTURE SIMULATION

BACKGROUND

The present invention relates generally to edge computing. More particularly, the present invention relates to a method, system, and computer program for high scale simulation a of multi-layer edge architecture.

Edge computing architecture is a type of computer architecture design that focuses on performing computing, i.e., processing data, at the closest point to which data is being received. Edge computing architecture enables processing to occur more quickly than some remote data processing architectures by reducing latency and lag caused by transmitting data over long distances for processing. Applications and programs running at the "edge" are able to respond to user interaction and incoming data more quickly and efficiently, thereby resulting a more responsive user experience as well as an increase in computational performance.

Edge computing architecture is a distributed computing architecture that encompasses all the components active in edge computing, including but not limited to, devices, sensors, servers, clouds, etc., where data is processed and/or used at the far reaches of a network. However, in a multi-layer edge architecture, a cloud storage or other central storage location may still be incorporated as a layer in the mule-layer edge computing architecture. Edge computing encompasses an ecosystem of infrastructure components that may be dispersed from the central location of an enterprise's datacenter outwardly, across all edge locations. The components may include, but are not limited to, compute and storage components, connectivity components, applications, devices, sensors, etc.

In an edge computing architecture configuration, information may be collected at devices and/or sensor systems that possess enough bandwidth, memory, processing ability and functionality, to collect, process, and execute upon data in real-time with little to no help from other parts of the network. There is, however, some kind of connectivity with the network that enables communication between the device and a database at a centralized location.

SUMMARY

The illustrative embodiments provide for multi-layer edge architecture simulation. An embodiment includes establishing a virtual representation of a network configuration, wherein the virtual representation of the network configuration comprises a plurality of layers corresponding to the network configuration. An embodiment includes generating a plurality of workloads to simulate with the virtual representation. An embodiment includes generating a plurality of workload statuses to simulate with the virtual representation. An embodiment include simulating the plurality of workloads. An embodiment includes simulating the plurality of workloads statuses. An embodiment includes receiving simulation results responsive to simulating the plurality of workloads and simulating the plurality of workload statuses.

Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
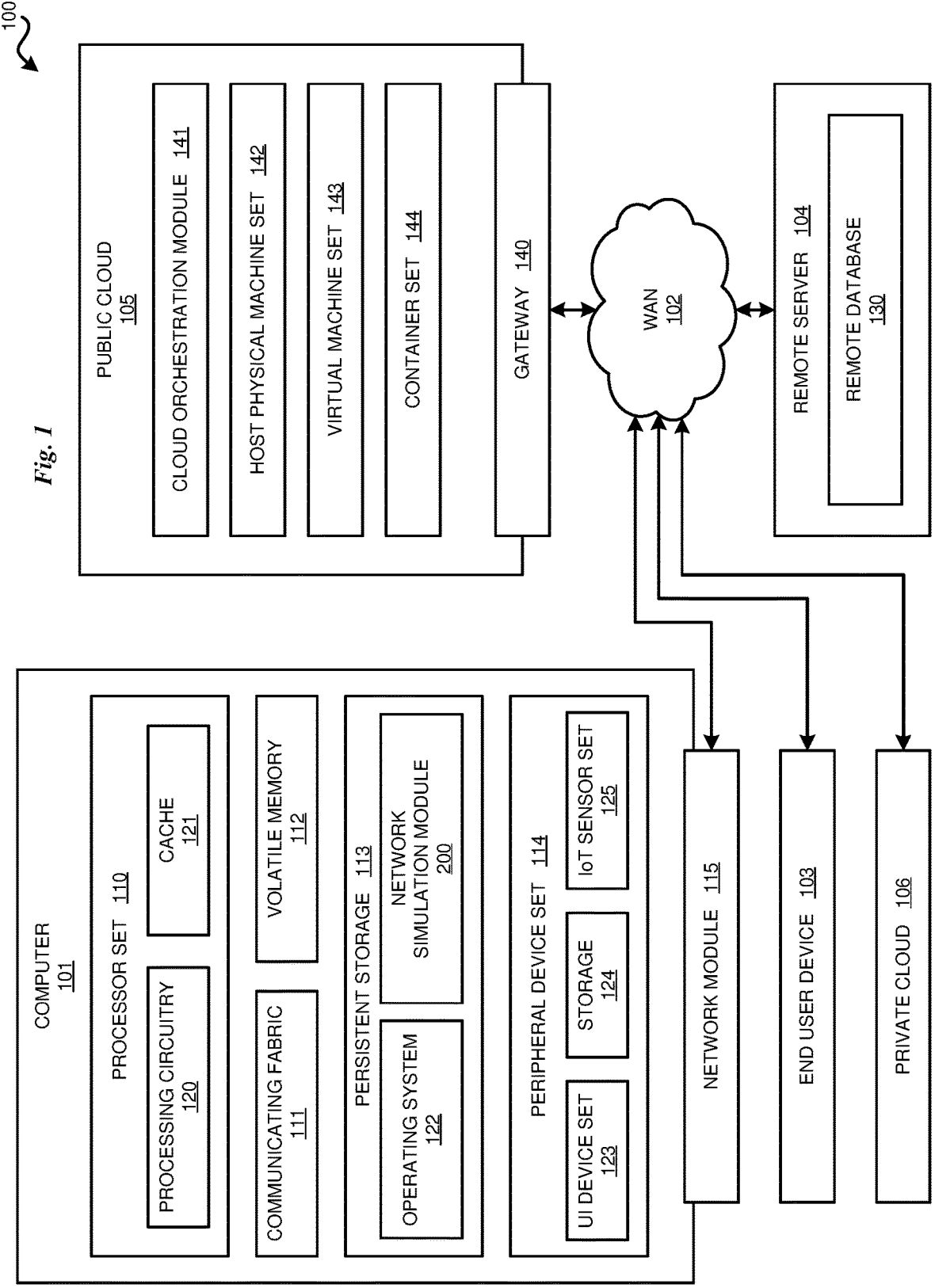
FIG. 1 depicts a block diagram of a computing environment in accordance with an illustrative embodiment.

Many tools currently exist today that enable simulating the performance of a computer network configuration. However, these tools are often limited by the scale of simulations that can be executed. Despite advancements in network simulation, these tools are often ineffective for performing high scale simulations.

Currently there is no efficient way to adequately simulate a high-scale amount of workloads and status collection on a network configuration. One problem addressed by this disclosure includes solving how to efficiently simulate an extremely large-scale load (both in terms of edge endpoints and workloads) on a central hub in multi-layer edge architecture. The present disclosure addresses the deficiencies described above by providing a process (as well as a system, method, machine-readable medium, etc.) that develops a system that composes multiple simulators such that each simulator simulates a different part of the network system, and the combined system of simulators effectively enables simulation of at least millions to hundreds-of-millions of workloads in an efficient and easy to run configuration.

The illustrative embodiments provide for high-scale multi-layer edge architecture network simulation. Embodiments disclosed herein describe a network as a multi-layer edge architecture network; however, use of this example is not intended to be limiting, but is instead used for descriptive purposes only. Instead, the network can include elements of one or more of other types of network architectures as well.

As used throughout the present disclosure, the term "edge computing" refers to a computer networking architecture paradigm that distributes computational resources closer to the location where data is obtained. Accordingly, in edge computing, data may be processed and analyzed locally on or near the devices generating the data, instead of solely on a centralized cloud or data center infrastructure. Some benefits of edge computing architecture include reduced latency, improved efficiency, and enhanced real-time processing capabilities.

As used throughout the present disclosure, the term "edge" refers to an outermost layer of an edge computing network environment. Accordingly, the edge layer of an edge computing network environment may include one or more endpoint network devices or clusters of endpoint devices. As used throughout the present disclosure, the term "endpoint network device" (or simply "endpoint device") refers to a computing device that serves as a point of interaction between a user and a network and/or a software application. Further, an endpoint device may include a sensor device that may include one or more sensors configured to collect and transmit data about an environment. As a nonlimiting example, a thermostat is a type of endpoint device that includes a sensor device. In the context of an edge computing network configuration, it is understood that a portion of data processing may take place at an endpoint device.

As used throughout the present disclosure, the term "multi-layer edge architecture" (or simply "multi-layer system") refers to an edge computing network environment configuration that includes a plurality of layers. The plurality of layers of the multi-layer system may include, for example, a central hub layer, a regional hub layer, and an endpoint device layer. The exact configuration of layers, and network nodes aggregated in each layer, may be implementation specific. The example multi-layer configuration described in the present disclosure is not intended to limiting aspect of the present disclosure, but is instead provided for the sake of clarity with regards to example embodiments disclosed herein.

As used throughout the present disclosure, the term "layer" refers to aggregate of network nodes. Further, the term "layer" may also refer to an aggregate of other aggregates of nodes, and so forth. The exact configuration aggregation of network nodes, elements, components, etc., may be implementation specific. Further, the term "cluster" as used throughout the present disclosure refers to an aggregate of network devices.

As used throughout the present disclosure, the term "simulated workload" (or simply "workload") refers to a specific set of activities, tasks, or operations that are simulated to assess how well a network infrastructure can handle the associated demands. A workload may represent the collective demand imposed on the network by various users, applications, and/or devices engaging in specific interactions over a defined period. An example of a simulated workload may include, but is not limited to, simulating registration of a device on a network; however, the use of this example is not intended to be limiting, and other types of simulated workloads are considered and may be employed as well.

As used throughout the present disclosure, the term "workload placement" refers to a the action of deploying a workload on a network device, and may also refer to the action of deploying a simulated workload on a simulated network device. Accordingly, a simulated workload placement may include the deliberate assignment and/or distribution of simulated workloads across a network infrastructure that enables assessment of the ability of the network to handle varying demands and resource requirements. Simulated workload placement may include placing synthetic or emulated workloads in specific locations within the network infrastructure. Determining where within the network infrastructure the simulated workloads will be placed may include selecting specific devices, servers, or network segments to assess the performance of those components under varying load conditions. Some embodiments disclosed herein consider simulated workloads placed on endpoint devices (such as IoT devices, sensors, or user devices) and servers to evaluate how well these components and hubs for these components are able to handle the generated traffic and demands on the network.

As used throughout the present disclosure, the term "workload status" refers to an indication send in the form of a message from a network device indicating the status of a workload execution on a network device. An example status may include, but is not limited to, "Running", "Deploying", "Pending", "Error", "Completed", etc. The exact status or statuses may be implementation specific.

Illustrative embodiments include establishing a multi-layer network architecture configuration. In an embodiment, the multi-layer system includes a central/global layer, a regional layer comprising a plurality of regional clusters, and an edge layer comprising a plurality of endpoint network devices, such that the plurality of endpoint network devices are categorized into regional clusters of the regional layer. In other embodiments, the exact configuration of the multi-layer network is implementation specific, and is not intended to be a limiting aspect of the present disclosure.

Illustrative embodiments include simulating testing for layer in a multi-layer network environment. An embodiment includes replicating specific characteristics and/or conditions of each layer. An embodiment includes emulating the characteristics and/or conditions of each layer. In some embodiments, network conditions may include, but are not limited to, latency, bandwidth limitations, packet loss, throughput, etc.

Illustrative embodiments include simulating workloads for plurality of simulated network endpoints. In some embodiments, a network endpoint is simulated using a virtual machine. In some embodiments, a network endpoint is simulated using a containerized application. In some embodiments, one or more network endpoints are simulated using any combination of virtual machines and containerized applications. In an embodiment, the edge endpoints simulator may simulate multiple network endpoints in a single process and/or application. Accordingly, simulation of 1,000 endpoints may be accomplished with a single process and/or application rather 1,000 separate containers, applications, virtual machines, etc., In an embodiment, the single process and/or application may simulate any number of endpoint devices, thereby enabling simulation of any size network configuration, irrespective of the scale of the network configuration.

Illustrative embodiments include configuring and deploying multiple simulators such that the combined multiple simulators are capable of simulating a high-scale load as desired, based on the configurations of the simulators. For example, suppose a user desired to simulate 1M managed endpoints and 100M status updates processed in a centralized hub. To reach 1M managed endpoints and 100M status updates processed in a centralized hub, the following example simulators may be configured. An edge endpoints simulator may be configured to simulate 1,000 managed endpoints. A workload placement simulator may be configured to deploy 100 workloads for each of the 1,000 endpoints. Accordingly, the workload placement simulator may be configured to deploy each workload to each of the 1,000 endpoints of a cluster of endpoints. A workload status simulator may be configured to simulate a status for each workload. Accordingly, each workload that is deployed to a single endpoint produces a status. In the example scenario, since there are 1,000 endpoints, and each endpoint is reporting statuses of 100 workloads, the single regional hub comprising a cluster of simulated endpoint produces 100K workload statuses. A regional hub simulator may be configured to replicate the single regional hub. Thus, suppose the regional hub simulator simulates 1,000 regional hubs, this will replicate the 100K statuses 1,000 times in order to achieve 100M status updates.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as a network simulation module 200 that simulates execution of workloads on multiple layers of a network and provides simulation results that provide insight to the capacity of a network configuration upon execution of the workloads. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
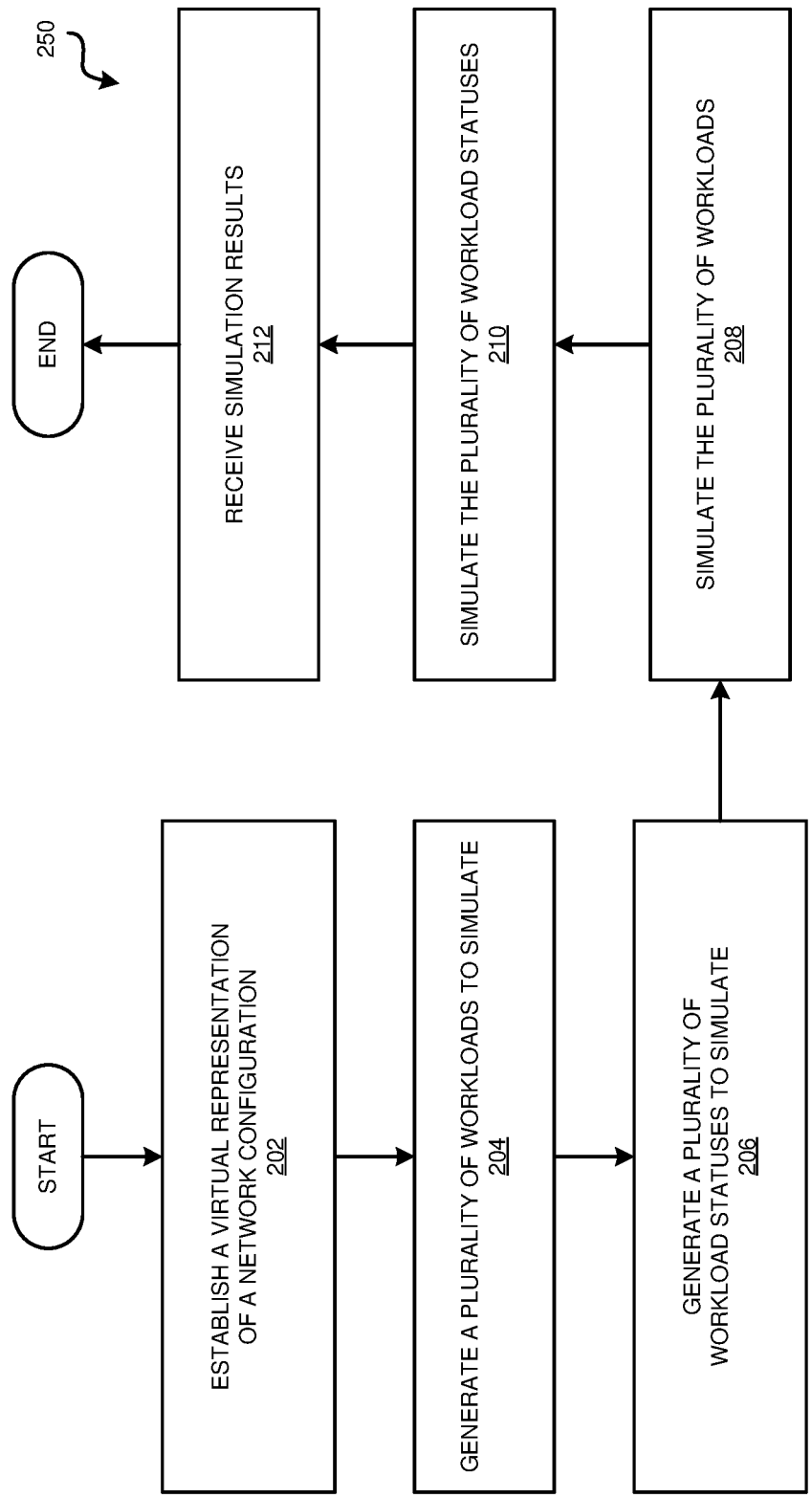
FIG. 2 depicts a flowchart of an example process for multi-layer edge network simulation in accordance with an illustrative embodiment.

With reference to FIG. 2, this figure depicts a flowchart of an example process for multi-layer edge network simulation in accordance with an illustrative embodiment. In a particular embodiment, the network simulation module 200 of FIG. 1, network simulator 310 of FIG. 3, and/or network simulator module 700 of FIG. 7 carries out the process 250.

At step 202 the process establishes a virtual representation of a network configuration. In some embodiments, the virtual representation is representative of an actual existing network physical network configuration. In some embodiments, the virtual representation of representative of a hypothetical network configuration. In a particular embodiment, the virtual representation is a representative of an edge architecture network configuration. In some such embodiments, the multi-layer edge architecture network configuration comprises a multi-layer edge architecture network configuration such that comprises a plurality of layers. In some such embodiments, the plurality of layers of the multi-layer edge architecture network configuration includes an edge layer such that the edge layer comprises a plurality of edge endpoint devices. Further, in some embodiments, the plurality of layers of the multi-layer edge architecture network configuration may include one or more aggregate layers, such that each layer of the one or more aggregate layers may include a plurality of network devices, such as edge point devices and/or non-edge point devices, and/or a plurality of other layers of the network architecture configuration.

Further, it is contemplated herein that the virtual representation may be configured according to any configuration preferences, such that the configuration preferences may include a particular number and arrangement of layers, a particular number, type(s), and/or arrangement of network devices, specific network characteristics, specific network conditions. In an embodiment, the exact configuration of the virtual representation may be implementation specific and may be determined by a user having sufficient administrative privileges associated with an illustrative embodiment of the disclosed process.

At step 204 the process generates a plurality of workloads to simulate on the virtual representation of the network configuration. In an embodiment, the process generates a number of simulated endpoint devices representative of endpoints devices of a real network, and the plurality of workloads are generated to be deployed for each simulated endpoint device. At step 206 the process generates a plurality of workload statuses to simulate on the virtual representation of the network configuration. In an embodiment, the simulated workload statuses correspond to the workloads deployed on the simulated endpoint devices. For example, suppose 1,000 network devices are simulated, and 100 workloads are deployed for each network device. In such a scenario, 100,000 workload statuses may be simulated on the virtual network representation.

At step 208 the process simulates the plurality of workloads. At step 210 the process simulates the plurality of workloads statuses corresponding to the plurality of workloads simulated. At step 212 the process receives simulation results responsive to simulating the plurality of workloads and from simulating the plurality of workload statuses. In an embodiment, the process further comprises determining a maximum capacity of the network configuration based at least in part on the simulation results received.

In an embodiment, the process further includes incrementally generating additional workloads and/or workloads statuses to simulate. Accordingly, in an embodiment, the process further includes incrementally increasing the total amount of workloads and/or workload statuses to be simulated. In an embodiment, the number of endpoint devices, workloads, and workload statuses may be grouped together under a managing hub. In an embodiment, the process further includes simulating a managing hub to replicate a real managing hub. For example, suppose a single managing hub provides 100,000 workload status. If the managing hub simulator replicates the load 1,000 times, then the total workload statuses may be increased to 100 million total workload statuses received by the virtual representation of the network.

In an embodiment, the illustrative process may be utilized to simulate a stress-test of an existing network configuration, to determine how many endpoint devices a network configuration may be able to handle at one time. In another embodiment, the illustrative process may be utilized in part to design a network configuration prior to physical implementation of a proposed network configuration design.

Figure 3:
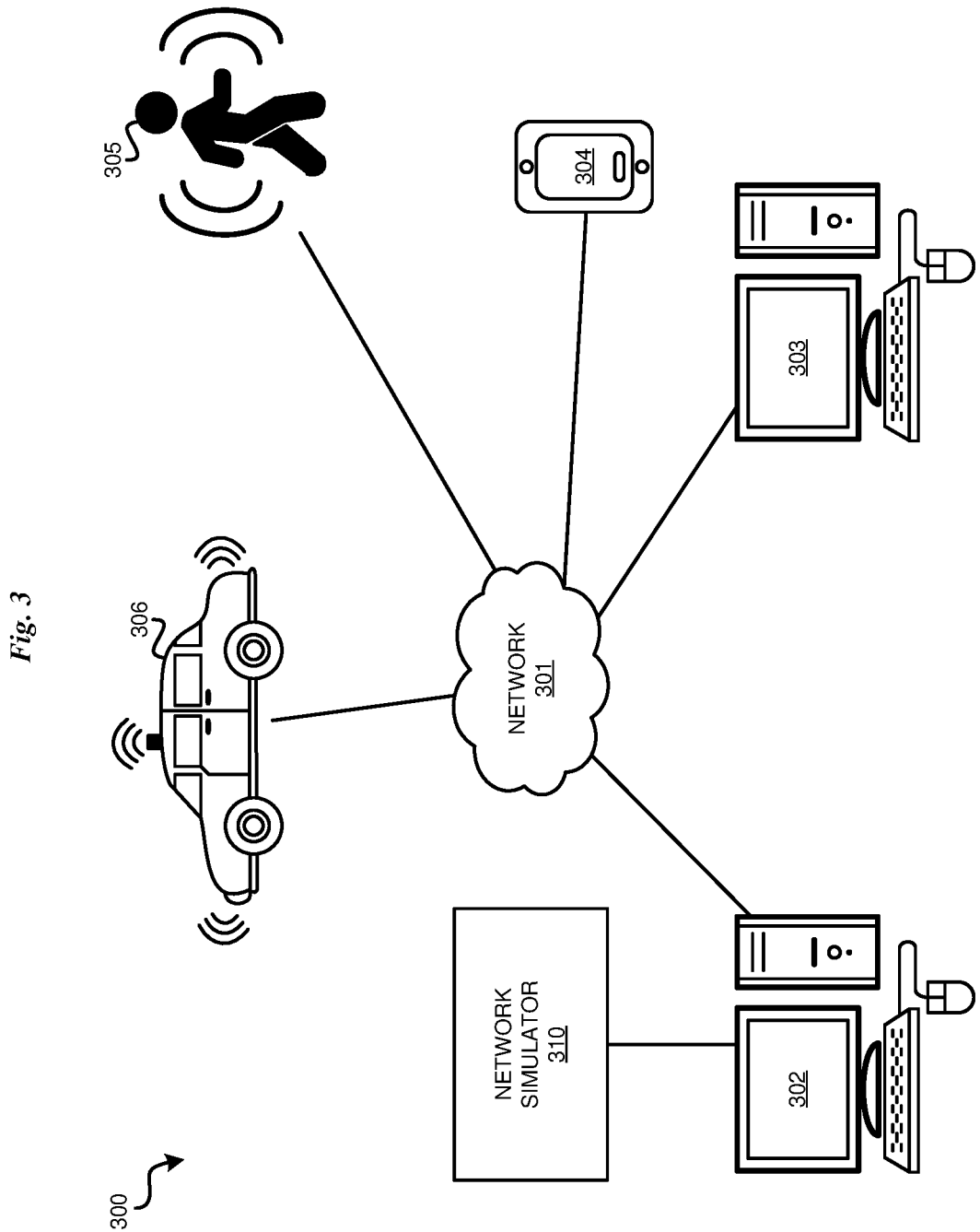
FIG. 3 depicts a block diagram of an example computing environment of network simulator module in accordance with an illustrative embodiment.

With reference to FIG. 3, this figure depicts a block diagram of an example computing environment of network simulator module in accordance with an illustrative embodiment. In the illustrated embodiment, network simulator 310 may include aspects of the network simulation module 200 of FIG. 1.

In the illustrated embodiment, the network simulator 310 is a software module configured to simulate endpoint devices, workloads, and workload statuses corresponding to simulated workloads deployed on the simulated endpoint devices. In an embodiment, the network simulator 310 comprises multiple synchronized simulators, such as an endpoint device simulator, a workload simulator, a workload status simulator, and a hub simulator. Accordingly, the endpoint device simulator simulates endpoint devices that would be connected to particular hub of a network. The workload simulator simulates workloads that are deployed to the simulated endpoint devices. The workload status simulator simulates workload statuses that would be resultant from execution of the simulated workloads deployed on the simulated endpoint devices. The hub simulator simulates additional hubs, thereby replicating the conditions, characteristics, and parameters of the original simulated hub.

For example, suppose the endpoint simulator is configured to simulate 1,000 endpoint devices. Further suppose the workload simulator is configured to deploy 100 workloads to each of the 1,000 simulated devices, and the workload status simulator is configured to generate a workload status for each workload deployed. In such a scenario, the simulated hub may receive 100,000 workload statuses from the original simulated hub. Further, suppose the hub simulator is configured to replicate the original hub 1,000 times, thereby creating a simulation that includes 100 million workload statuses.

In the illustrated embodiment, a network 301 is shown. In an embodiment, the network 301 comprises an edge architecture style network. In such an embodiment, the network 301 includes a plurality of edge endpoint devices connecting to the network 301 across various layers via various hubs. For the sake of simplicity, the figure depicts a first endpoint device 303, a second endpoint device 304, a third endpoint device 305, and a fourth endpoint device 306. In practicality, each of the endpoint devices may be connected according to different connections to network 301. The configuration and complexity of the network 301 may be implementation specific, as described in greater detail herein. Further, in some embodiments, the network 301 may comprise any suitable network configured to transmit information between at least the depicted components of computing environment 300. Although a plurality of endpoint devices are shown that represent possible endpoint devices of a network configuration, to perform a simulation of the network devices as described herein, the real edge devices 303-306 may not be necessary to actually perform the simulation.

In the illustrated embodiment, an administrator device 302 is shown deploying the network simulator software 310.

Further, administrator device 302 may include a backend administration system allows users with administrative privileges to perform various administrative tasks associated with the network simulator software 310 as described herein, such as adjusting parameters and/or initiating simulation of workloads and workload statuses.

Figure 4:
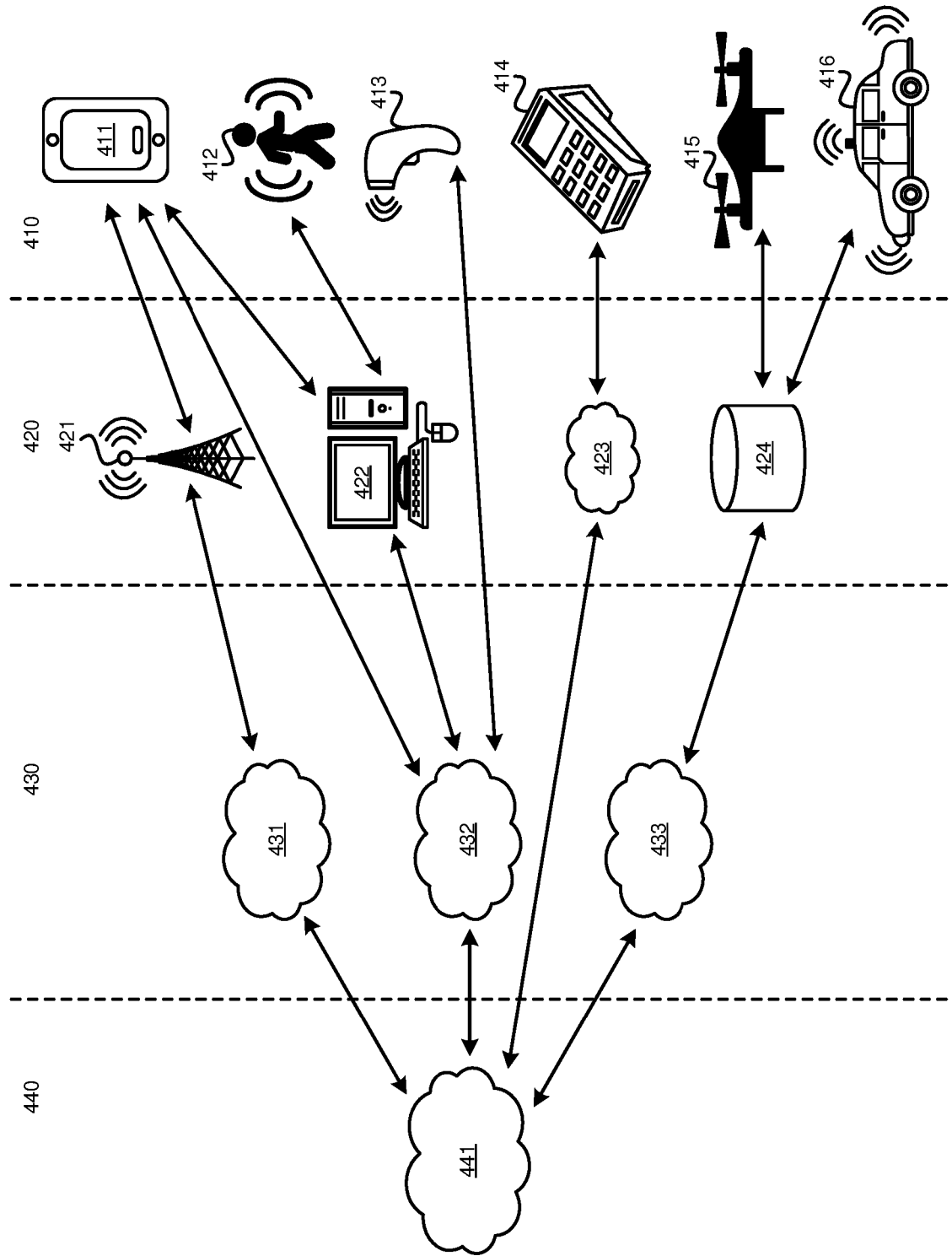
FIG. 4 depicts a block diagram of an example edge network architecture network environment configuration in accordance with an illustrative embodiment.

With reference to FIG. 4, this figure depicts a block diagram of an example edge network architecture network environment configuration in accordance with an illustrative embodiment. In the illustrated embodiment, the network environment configuration is depicted as including a plurality of layers, including an edge layer 410, a second layer 420, a third (regional) layer 430, and a central hub layer 440. Although the depicted network configuration is depicted as including four layers for the sake of clarity, it is understood that network configurations may comprise various degrees of complexity, and the exact configuration and organization of a network environment may be implementation specific. Embodiments of the present disclosure refer to the network architecture as an edge network architecture; however, use of this example is not intended to be limiting, and embodiments disclosed herein may be suitable for any type of network environment configuration.

In the illustrated embodiment, the plurality of edge endpoint devices of the edge layer 410 includes a smartphone 411, a wearable device equipped by a person 412, a scanner 413, a POS terminal 414, a drone 415, and an autonomous vehicle 416. In the illustrated embodiment, the edge endpoint devices communicate with other devices, locations, hubs, databases, etc. of the second layer 420. In the illustrated embodiment, the second layer 420 is shown including a wireless communication tower 421, a computing device 422, a cloud 423, and a database 424, which each communicate with the devices of the edge layer 410, as depicted.

In the illustrated embodiment, the regional layer 430 is shown including a plurality of regional hubs. In the illustrated embodiment, the regional layer 430 is shown depicting a first regional hub 431, a second regional hub 432, and a third regional hub 433. In the illustrated embodiment, each regional hub of the plurality of regional hubs depicted is shown in communication with endpoint devices and/or other aggregates from other layers. In the illustrated embodiment, the central hub layer 440 is in communication with the regional hubs of the regional hub layer 430.

In the illustrated embodiment, the network architecture is shown including a plurality of layers, and layers of the plurality of layers may be aggregates of other layers, devices, and/or components of the network. As mentioned throughout this disclosure, the exact configuration of the network may be implementation specific and may depend considerations of the owner(s) and/or designer(s) and/or applications and underlying purposes for which the network is utilized. In the illustrated embodiment, edge layer 410 is depicted as the "edge" of the network, and comprises a plurality of edge endpoint devices, as shown. As depicted in the figure, edge point devices of edge layer 410 as depicted as communicating to different components and hubs within the network.

Figure 5:
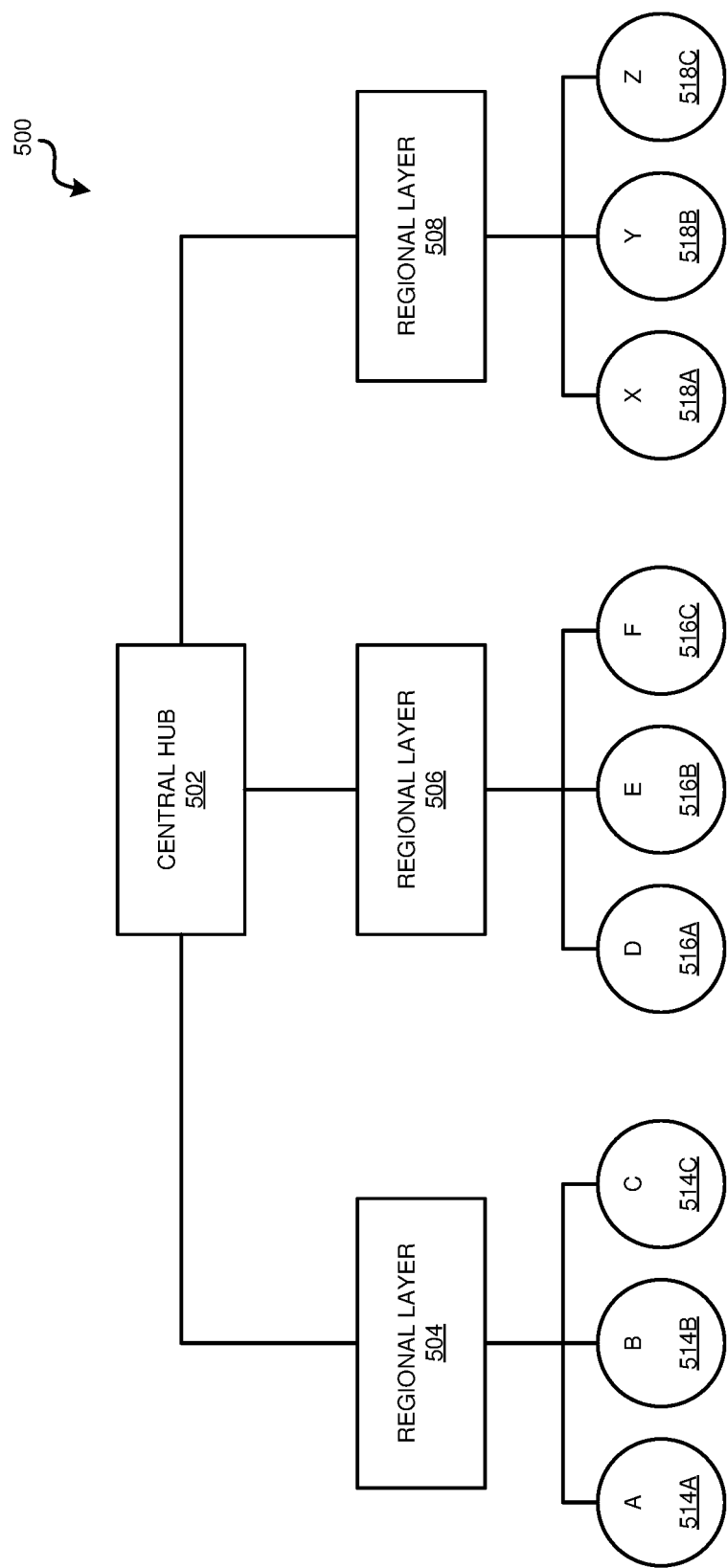
FIG. 5 depicts a block diagram of an example hierarchically organized edge network architecture network environment configuration in accordance with an illustrative embodiment.

With reference to FIG. 5, this figure depicts a block diagram of an example hierarchically organized edge network architecture environment in accordance with an illustrative embodiment. In the illustrated embodiment, a 3-layer network architecture is shown. However, this example configuration is not intended to be limiting, and one skilled in the art may adapt the disclosed methods for configurations that include any number of layers.

In the illustrated embodiment, the three layers depicted include an edge layer, a regional hub layer, and a central hub layer. As depicted, the edge layer includes clusters of endpoint devices connected to different regional hubs. In the illustrated embodiment, a first regional layer hub 504 is shown managing endpoint device A 514A, endpoint device B 514B, and endpoint device C 514C. Further, in the illustrated embodiment, a second regional layer hub 506 is shown managing endpoint device D 516A, endpoint device E 516B, and endpoint device F 516C. Further, in the illustrated embodiment, a third regional layer hub 508 is shown managing endpoint device X 518A, endpoint device Y 518B, and endpoint device Z 518C. In the illustrated embodiment, the first regional layer hub 504, the second regional layer hub 506, and the third regional layer hub 508, are all connected and managed by the central hub 502 of the central hub layer.

Figure 6:
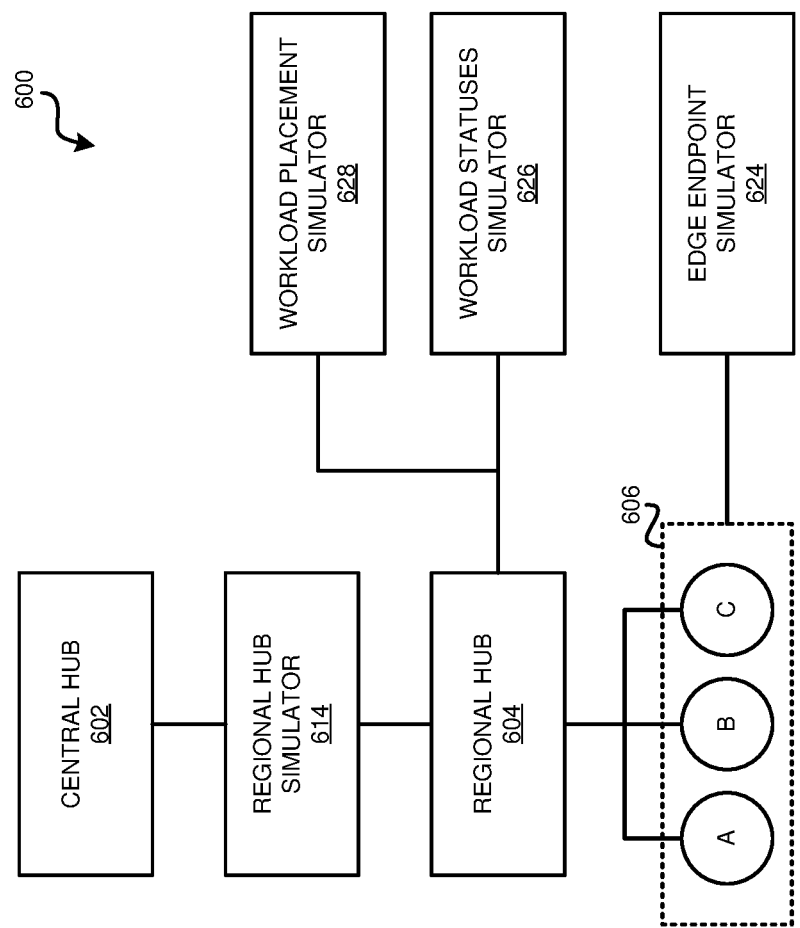
FIG. 6 depicts a block diagram of an example network layer simulator in accordance with an illustrative embodiment.

With reference to FIG. 6, this figure depicts a block diagram of an example network layer simulator in accordance with an illustrative embodiment. In the illustrated embodiment, a 3-layer network architecture is shown. However, this example configuration is not intended to be limiting, and one skilled in the art may adapt the disclosed methods for configurations that include any number of layers. Further, in the illustrated embodiment, only a single regional hub 604 is shown managing a single endpoint device cluster 606. This simplified depiction of the configuration of the example process is provided for sake of clarity, and it is contemplated that in practicality, any number of regional hubs can be simulated by any number of regional hub simulators.

In the illustrated embodiment, the edge endpoint simulator 624 is configured to simulate a cluster of endpoints, such as a cluster of endpoints 606 that may correspond to a regional hub 604. Further, in the illustrated embodiment, workload placement simulator 628 is configured to simulate placement of a plurality of workloads corresponding the simulated edge endpoints. In an embodiment, a workload is placed on an endpoint device in order to be able to simulate and/or retrieve a status from that endpoint device. Further, in the illustrated embodiment, the workload statuses simulator 626 is configured to simulate workload statuses for each endpoint device of the simulated cluster of endpoints simulated by the edge endpoint simulator 624 based on the workload placements that have simulated by the workload placement simulator 628. Further, the workload placement simulator 628, workload statuses simulator 626, and edge endpoint simulator 624 are coordinated to simulate the workloads of the simulated endpoints corresponding to the regional hub 604. Further, in the illustrated embodiment, regional hub simulator 614 is configured to replicate the endpoints, workloads, and workloads statuses previously simulated to effectively replicate the entire simulated workload. Further, in the illustrated embodiment, the central hub 602 may include an actual central hub of a network configuration that is in communication with the regional hub simulator 614.

Edge management of multiple clusters includes the edge endpoints pulling information from the regional hub 604 and/or central hub 602 as well as pushing information to the regional hub 604 and/or central hub 602. This allows the edge endpoints to work in disconnected modes (e.g., if the edge endpoint loses connectivity) without any effect on the other edge endpoints or the regional hub 604 and/or central hub 602. In such cases, the managing hub can continue working as usual without affecting the performance, whether any of the edge endpoints are connected or not. To register managed endpoints/clusters to a managing hub, an initial registration request is sent from the managed endpoint to the managing hub. After the initial request is accepted and the endpoint is registered with the managing hub, the managed cluster/endpoint continues to send updates to the managing hub, which marks the liveness of the edge endpoints so long as the endpoint is still connected.

In the illustrated embodiment, an embodiment of the disclosed process simulates the managed clusters/endpoints. In an embodiment, the process may deploy one actual regional hub 604 and run additional process 624 for edge endpoints simulator. The edge endpoints simulator sends registration requests, receives back responses and acts with a timer to send liveness messages of the simulated endpoints before the edge endpoints are considered disconnected, depending on the timeout period configured in the regional hub 604. The number of simulated endpoints can be pre-configured to match the required scale as desired.

In the illustrated embodiment, the process 600 simulates workloads that run on the simulated edge endpoints. Deploying workloads includes creating an isolated entry point for each managed endpoint/cluster on the managing hub. The managed endpoint has access only to its entry point and is using this entry point to pull workloads from the managing hub and push status updates to the managing hub. For example, if an administrator desired to deploy a workload to a specific managed endpoint, the administrator may deploy the workload and a placement rule to make sure the workload will be placed on the required managed endpoint. In some embodiments, the placement rule may be automatically generated by the system, where deployments are based on available resources. As a result of the placement rules, the managing hub business logic puts a copy of the workload in the desired managed endpoint isolated space on the hub. The managed endpoint/cluster pulls resources from its isolated space and deploys them on the edge endpoint. Once a status can be reported, it reports back using the same isolated space on the managing hub.

To simulate workloads that run on the simulated edge endpoints, the same process as described above may be used to simulate workloads and statuses from the various simulated edge endpoints. In an embodiment, the process deploys real workloads resources to the managing hub and runs the workloads placement simulator 628 and workloads statuses simulator 626 to manipulate workloads placement and statuses to simulate as if the workload is actually running on the edge endpoints. Accordingly, a person or other entity (e.g., a user running the simulation manually, an automated system that runs the simulation automatically, etc.) that runs the simulation may control the deployment of the real workload resources to the managing hub.

In the illustrated embodiment, the workloads placement simulator 628 runs iteratively in a loop, and in each iteration selects a random number of endpoints per workload. In some embodiments, the number of endpoints can be configured by an administrator. Further, parameters such as minimum number of endpoints, and max number of endpoints may likewise be configured by an administrator. After selecting the number of endpoints randomly, the process updates the placement rules accordingly in the hub to simulate the workload on the selected endpoints.

In the illustrated embodiment, the workloads statuses simulator 626 is fed with the information that was selected by the workloads placement simulator 628 in each iteration, and for each managed endpoint that was selected by the placement simulator, waits a predetermined or randomly selected time (which likewise may be configured by an administrator) and reports back to the managing hub a manipulated status of the workload, as if workload was deployed in a real managed endpoint. For reporting status of a workload, the workloads statuses simulator 626 is aware of the valid options for a workload which also can be pre-configured per workload type. For example, when deploying an application to a managed endpoint, valid statuses might include, but are not limited to "Running", "Deploying", "Pending", "Error", "Completed", etc.

Figure 7:
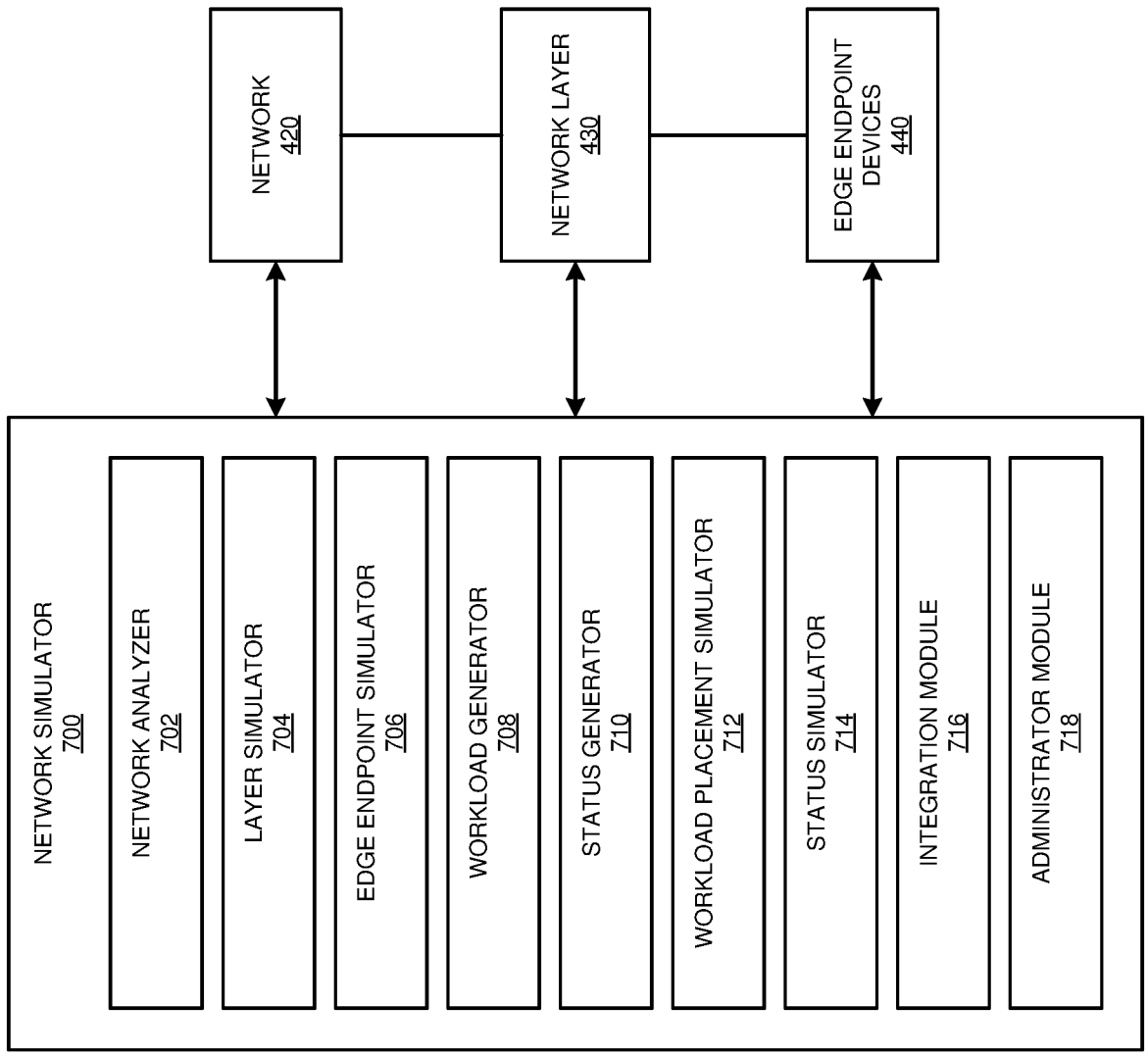
FIG. 7 depicts a block diagram of an example network simulator module in accordance with an illustrative embodiment.

With reference to FIG. 7, this depicts a block diagram of an example network simulator module in accordance with an illustrative embodiment. In the illustrated embodiment, network simulator module 700 may include some aspects of network simulator module 200 of FIG. 1 and/or network simulator module 310 of FIG. 3.

In the illustrated embodiment, the network simulator module 700 is a software module that may include network analyzer module 702, layer simulator module 704, network edge endpoint simulator module 706, workload generator module 708, status generator module 710, workload placement module 712, status simulator module 714, integration module 716, and administrative module 718. In alternative embodiments, the network simulator module 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the network analyzer module 702 is a software module configured to analyze a network. In the illustrated embodiment, the network analyzer module 702 receives monitored data from a network to establish a virtual representation of the network. The network analyzer module evaluates the monitored data to determine aspects of the network. Embodiments of the network may include one or more of a variety of different types of networks having varying degrees of complexity. Embodiments disclosed herein described the network within the context of a multi-layer edge network; however, this is for descriptive purposes only and is not intended to be limiting, and other network architecture configurations are considered herein.

The network analyzer module 702 may be configured to determine all aspects associated with a network, including but not limited to, network characteristics, network conditions, network devices, network configuration, network layers, network nodes, network connections, etc. In an embodiment, network analyzer module 702 enables network simulator 700 to construct a virtual representation of a network analyzed by network analyzer module 702 based at least in part on aspects of the network that have been determined by network analyzer module 702. For example, network analyzer module 702 may analyze a network to determine that the network includes an edge layer comprising various network devices, and several other aggregate layers that receive and/or transmit data between said aggregate layers and other layers and/or network devices connected to the network.

In the illustrated embodiment, layer simulator module 704 is a software module configured to simulate execution of applications and/or processes and/or data communication across a layer of a network and/or between layers of a network. In an embodiment, layer simulator module is configured to simulate different managing hubs of the network.

In the illustrated embodiment network edge endpoint simulator module 706 is a software module configured to simulate execution of actions, routines, processes, and/or applications of a plurality of endpoint devices of a of a network. Accordingly, the edge endpoint simulator simulates endpoint devices that would be connected to particular hub of a network.

In the illustrated embodiment workload generator module 708 is a software module configured to generate a plurality of workloads to simulate and/or deploy. In the illustrated embodiment workload placement module 712 is a software module configured to simulate placement of workloads on simulated network devices connected to a network. Accordingly, the workload generator module 708 generates workloads that are deployed to the simulated endpoint devices by workload placement module 712.

In the illustrated embodiment status generator module 710 is a software module configured to generate plurality of workloads to simulate and/or deploy. The workload status simulator simulates workload statuses that would be resultant from execution of the simulated workloads deployed on the simulated endpoint devices. In the illustrated embodiment status simulator module 714 is a software module configured to simulate various workload statuses associated with workloads placed on simulated devices.

For example, suppose the edge endpoint simulator 706 is configured to simulate 1,000 endpoint devices. Further suppose the workload placement module 712 is configured to simulate 1,000 workloads to each of the 1,000 simulated devices, and the workload status simulator module is configured to generate a workload status for each simulated workload deployed. In such a scenario, simulated hub generated by the layer simulator module 704 may receive 100,000 workload statuses from the original simulated hub. Further, suppose the layer simulate module 704 is configured to replicate the original hub 1,000 times, thereby creating a simulation that includes 100 million workload statuses.

In the illustrated embodiment integration module 716 is a software module configured to integrate the network simulator module 700 with a network, network applications, and/or network devices. In the illustrated embodiment administrative module 718 is a software module configured to enable a user having sufficient administrative privileges to perform various tasks associated with network simulator module 700. In an embodiment, the administrative module 718 allows a user with administrative privileges to perform various administrative tasks associated with the network management module as described herein, such as adjust one or more parameters of the virtual representation of the network, and/or initiate a network simulation.

Figure 8:
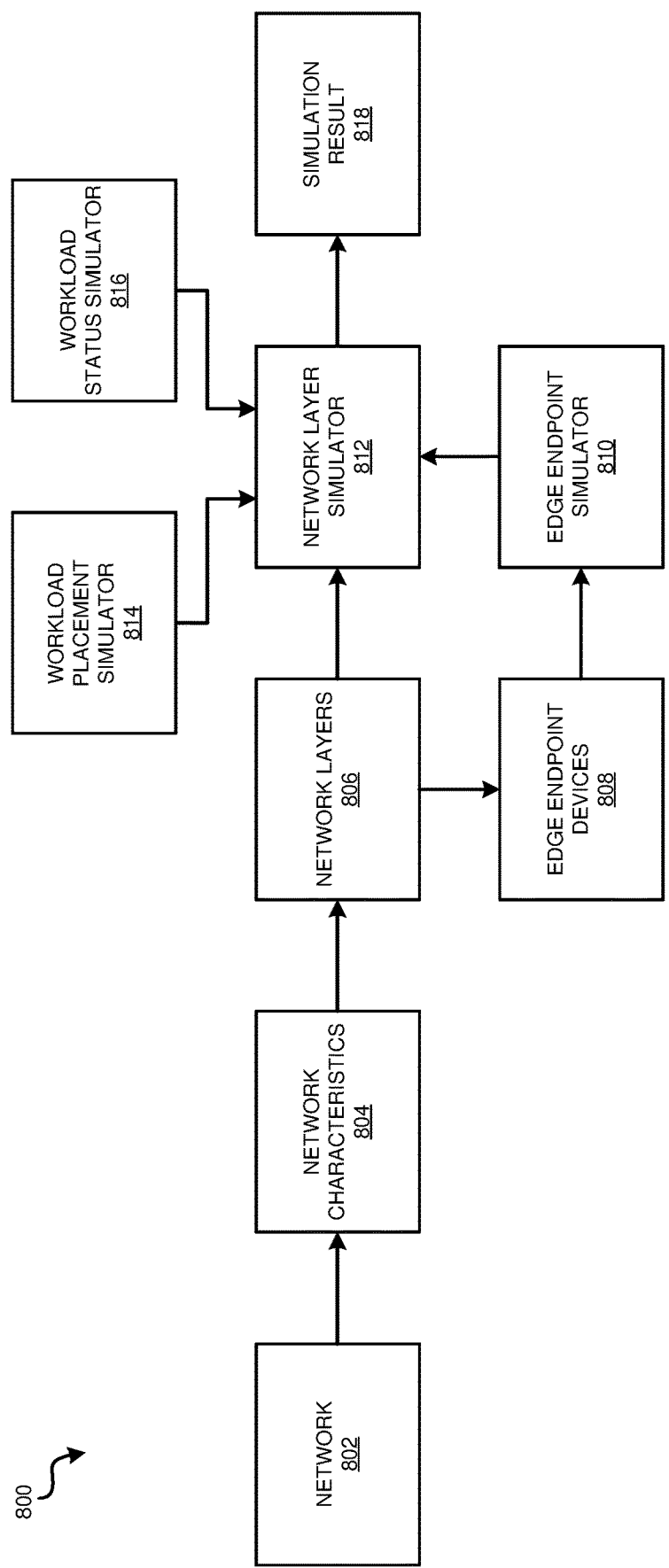
FIG. 8 depicts a block diagram of an example network simulation process in accordance with an illustrative embodiment.

With reference to FIG. 8, this figure depicts a block diagram of an example network simulation process in accordance with an illustrative embodiment. In the illustrated embodiment, the network simulator module 200 of FIG. 1, the network simulator module 310 of FIG. 3, and/or the network simulator module 700 of FIG. 7 is configured to carry out aspects of process 800 as described herein.

In the illustrated embodiment, analysis of network 802 provides information providing insight in the network characteristics 804 corresponding to the network 802. Further, the network characteristics 804 provides information regarding the configuration of network layers 806 of network 802. Further, information regarding the network layers 806 of the network 802 provides information regarding the number and/or types of edge point devices 808 of the network 802, as well as the flow of data between such devices and other components, managing hubs, and/or layers of the network 802.

In the illustrated embodiment, the edge endpoint simulator 810 simulates a number of edge endpoint devices. In an embodiment, an administrator may configure the edge endpoint simulator 810 to simulate a cluster of endpoint devices in the same amount as a cluster of endpoint devices of a particular layer of the network 802. In other embodiments, an administrator may select any number of endpoint devices to simulate.

In the illustrated embodiment, the workload placement simulator 814 generates and simulates a number of workloads to deploy onto each of the endpoint devices simulated by the edge endpoint simulator 810. Further, the workload status simulator 816 simulates workload status for each workload deployed on each endpoint device.

In the illustrated embodiment, the network layer simulator 812 replicates the aspects of the previously simulated endpoint devices, workloads, and workload statuses, as many times as configured by an administrator. Accordingly, the network layer simulator 812 may be configured to simulate additional managing hubs within the network 802. An administrator may simulate any number of managing hubs, and adjust the parameters of each managing hub, depending on preference.

In the illustrated embodiment, the example process produces simulation results 818 as a result of performing simulation of endpoint devices, network layers, workloads, workload statuses. The simulation results 818 may provide insight into the maximum capacity of a network, such that the maximum capacity reflects an actual existing network, or reflects a hypothetical network configuration that has not yet been actually configured. Some embodiments of process 800 are directed towards simulating a stress test for an actual network. Some other embodiments of process 800 are directed towards predicting performance of a future network. In some embodiments, the central hub depicted in various diagrams is a real central hub, i.e., a central hub that is not simulated.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   establishing a virtual representation of a network configuration, wherein the virtual representation of the network configuration comprises a plurality of layers corresponding to the network configuration, wherein each layer of the plurality of layers emulates a different set of network conditions;
   generating a plurality of workloads to simulate with the virtual representation, the plurality of workloads comprising a first set of workloads and a second set of workloads;
   generating a plurality of workload statuses to simulate with the virtual representation, the plurality of workload statuses comprising a first set of workload statuses and a second set of workload statuses;
   simulating a first layer of the virtual representation of the network configuration, the first layer comprising a first set of edge endpoints configured to execute the first set of workloads and the first set of workload statuses, the simulating based on a first set of network conditions corresponding to the first layer;
   simulating the second layer of the virtual representation of the network configuration, the second layer comprising a second set of edge endpoints configured to execute the second set of workloads and the second set of workload statuses, the simulating based on a second set of network conditions corresponding to the second layer; and
   replicating, by a hub simulator, the simulating of at least one of the first layer and the second layer upon receiving simulation results responsive to simulating the plurality of workloads and simulating the plurality of workload statuses.

2. The computer-implemented method of claim 1, further comprising incrementing at least one of an amount of workloads to simulate and an amount of workload statuses to simulate.

3. The computer-implemented method of claim 2, wherein the incrementing the amount of workloads to simulate is performed incrementally until an indication of failure associated with the simulating the workloads is received.

4. The computer-implemented method of claim 2, wherein the incrementing the amount of workload statuses to simulate is performed incrementally until an indication of failure associated with the simulating the workload statuses is received.

5. The computer-implemented method of claim 1, further comprising determining a maximum capacity of the network configuration based at least in part on the results of the simulation.

6. The computer-implemented method of claim 1, wherein the simulation results comprises a performance metric associated with the simulating the workloads and the workload statuses.

7. The computer-implemented method of claim 1, wherein the network configuration comprises an edge architecture network configuration.

8. The computer-implemented method of claim 7, wherein the edge network configuration comprises an edge layer, wherein the edge layer comprises a plurality edge endpoint devices.

9. The computer-implemented method of claim 8, wherein the edge network configuration comprises an aggregate layer, wherein the aggregate layer comprises a portion of the layers of the network configuration.

10. The computer-implemented method of claim 9, further comprising simulating a plurality of aggregate layers, and incrementing an amount of simulated aggregate layers until an indication of failure is received.

11. A computer program product for multi-layer edge architecture simulation comprising one or more non-transitory computer readable storage media, and program instructions collectively stored on the one or more computer readable storage media, the program instructions executable by a processor to cause the processor to perform operations comprising:
   establishing a virtual representation of a network configuration, wherein the virtual representation of the network configuration comprises a plurality of layers corresponding to the network configuration, wherein each layer of the plurality of layers emulates a different set of network conditions;
   generating a plurality of workloads to simulate with the virtual representation, the plurality of workloads comprising a first set of workloads and a second set of workloads;
   generating a plurality of workload statuses to simulate with the virtual representation, the plurality of workload statuses comprising a first set of workload statuses and a second set of workload statuses;
   simulating a first layer of the virtual representation of the network configuration, the first layer comprising a first set of edge endpoints configured to execute the first set of workloads and the first set of workload statuses, the simulating based on a first set of network conditions corresponding to the first layer;
   simulating the second layer of the virtual representation of the network configuration, the second layer comprising a second set of edge endpoints configured to execute the second set of workloads and the second set of workload statuses, the simulating based on a second set of network conditions corresponding to the second layer; and
   replicating, by a hub simulator, the simulating of at least one of the first layer and the second layer upon receiving simulation results responsive to simulating the plurality of workloads and simulating the plurality of workload statuses.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

14. The computer program product of claim 11, further comprising determining a maximum capacity of the network configuration based at least in part on the results of the simulation.

15. The computer program product of claim 11, further comprising incrementing an amount of workloads to simulate.

16. The computer program product of claim 15, wherein the incrementing the amount of workloads to simulate is performed iteratively until an indication of failure associated with the simulating the workloads is received.

17. The computer program product of claim 11, further comprising incrementing an amount of workload statuses to simulate.

18. The computer program product of claim 17, wherein the incrementing the amount of workload statuses to simulate is performed iteratively until an indication of failure associated with the simulating the workloads is received.

19. A computer system comprising a processor and one or more computer readable storage media, and program instructions collectively stored on the one or more computer readable storage media, the program instructions executable by the processor to cause the processor to perform operations comprising:
   establishing a virtual representation of a network configuration, wherein the virtual representation of the network configuration comprises a plurality of layers corresponding to the network configuration, wherein each layer of the plurality of layers emulates a different set of network conditions;
   generating a plurality of workloads to simulate with the virtual representation, the plurality of workloads comprising a first set of workloads and a second set of workloads;
   generating a plurality of workload statuses to simulate with the virtual representation, the plurality of workload statuses comprising a first set of workload statuses and a second set of workload statuses;
   simulating a first layer of the virtual representation of the network configuration, the first layer comprising a first set of edge endpoints configured to execute the first set of workloads and the first set of workload statuses, the simulating based on a first set of network conditions corresponding to the first layer;
   simulating the second layer of the virtual representation of the network configuration, the second layer comprising a second set of edge endpoints configured to execute the second set of workloads and the second set of workload statuses, the simulating based on a second set of network conditions corresponding to the second layer; and
   replicating, by a hub simulator, the simulating of at least one of the first layer and the second layer upon receiving simulation results responsive to simulating the plurality of workloads and simulating the plurality of workload statuses.

20. The computer system of claim 19, further comprising determining a maximum capacity of the network configuration based at least in part on the results of the simulation.

* * * * *